United States Patent
Dahlén

(10) Patent No.: US 8,660,009 B2
(45) Date of Patent: Feb. 25, 2014

(54) CORE NETWORK PROCESSING LOAD REDUCTION

(75) Inventor: Anders Dahlén, Västerhaninge (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 446 days.

(21) Appl. No.: 12/864,163

(22) PCT Filed: Jan. 30, 2008

(86) PCT No.: PCT/SE2008/050117
§ 371 (c)(1),
(2), (4) Date: Oct. 16, 2010

(87) PCT Pub. No.: WO2009/096833
PCT Pub. Date: Aug. 6, 2009

(65) Prior Publication Data
US 2011/0058480 A1    Mar. 10, 2011

(51) Int. Cl.
*G06F 11/00* (2006.01)

(52) U.S. Cl.
USPC .......................................................... 370/237

(58) Field of Classification Search
USPC .......................................................... 370/237
See application file for complete search history.

(56) References Cited

U.S. PATENT DOCUMENTS

| | | | |
|---|---|---|---|
| 8,059,567 B1 * | 11/2011 | Woodmansee et al. | 370/278 |
| 2005/0037769 A1 * | 2/2005 | Jami et al. | 455/453 |
| 2005/0047399 A1 * | 3/2005 | Lee et al. | 370/352 |
| 2008/0137536 A1 * | 6/2008 | Hede | 370/236 |
| 2009/0052460 A1 * | 2/2009 | Coulas et al. | 370/401 |
| 2009/0179755 A1 * | 7/2009 | Bachl et al. | 340/540 |
| 2010/0124926 A1 * | 5/2010 | Klatt et al. | 455/435.2 |

(Continued)

FOREIGN PATENT DOCUMENTS

| | | | | |
|---|---|---|---|---|
| EP | 1469698 A2 | 10/2004 | | |
| EP | 2053871 A1 | 4/2009 | | |
| WO | WO 2006/040608 | * | 4/2006 | H04Q 7/34 |
| WO | 2007/043932 A1 | 4/2007 | | |

OTHER PUBLICATIONS

3GPP TR 23.898 V7.0.0 Access Class Barring and Overload Protection, Mar. 2005, 3GPP, Release 7.*

(Continued)

*Primary Examiner* — Mark Rinehart
*Assistant Examiner* — Christopher R Crompton
(74) *Attorney, Agent, or Firm* — Potomac Patent Group PLLC

(57) ABSTRACT

A cellular radio communications network includes a core network with a core network node coupled to a radio access network (RAN) associated with a first radio access technology for communicating with mobile radio terminals. The RAN includes multiple RAN nodes. Each mobile radio terminal has an associated access class for accessing service from the cellular radio communications network. The core network node detects an overload condition and sends an overload message to the RAN nodes that includes information for reducing the overload condition. Each of the RAN nodes receives the overload message and determines whether an access class restriction should be implemented to reduce the number of mobile radio terminals permitted to access the cellular radio communications network. If so, the RAN node determines one or more access classes of mobile radio terminals to be restricted based on the information in the overload message. Information relating to the one or more restricted access classes is transmitted in an area associated with the RAN node so that the mobile terminals of a restricted access class are prohibited from accessing the cellular radio communications network.

29 Claims, 5 Drawing Sheets

(56) References Cited

U.S. PATENT DOCUMENTS

| | | | |
|---|---|---|---|
| 2010/0130204 A1* | 5/2010 | Kanauchi et al. | 455/435.1 |
| 2011/0090879 A1* | 4/2011 | Hamiti et al. | 370/338 |
| 2011/0170506 A1* | 7/2011 | Zisimopoulous et al. | 370/329 |
| 2011/0176423 A1* | 7/2011 | Chowdhury et al. | 370/236 |

OTHER PUBLICATIONS

Swedish Patent Office, Int'l Search Report in PCT/SE2008/050117, Mar. 12, 2008.

Int'l Bureau of WIPO, Int'l Preliminary Report on Patentability in PCT/SE2008/050117, Aug. 3, 2010.

NTTDOCOMO, On MME Overload Indication, Tdoc R3-072077, 3GPP TSG-RAN WG3 Meeting #58, Nov. 5-9, 2007, Jeju Island, KR.

Nokia Siemens, Overload Control on S1, Tdoc R3-072216, 3GPP TSG-RAN WG3 Meeting #58, Nov. 5-9, 2007, Jeju Island, KR.

Vodafone, Recovery from Overload Situations, TDoc S2-041400, 3GPP TSG SA WG2 Meeting #39, Apr. 19-23, 2004, Shenzhen, CN.

EPO, Supplementary European Search Report in EP 08 70 5382, Dec. 10, 2013.

Alcatel-Lucent, Specification of Overload over S1, R3-071955, Oct. 8, 2007, pp. 1-2, 3GPP TSG RAN3 #57bis, Sophia Antipolis, FR.

\* cited by examiner

CORE NETWORK PROCESSING LOAD REDUCTION

TECHNICAL FIELD

The technical field relates to a mobile radio communications system and regulating a processing load on one or more nodes in a core network associated with the mobile radio communications system.

BACKGROUND

Universal Mobile Telecommunications System (UMTS) is an example of a mobile radio communications system. UMTS is a 3rd Generation (3G) mobile communication system employing Wideband Code Division Multiple Access (WCDMA) technology standardized within the $3^{rd}$ Generation Partnership Project (3GPP). In the 3GPP release 99, the radio network controller (RNC) in the radio access network controls radio resources and user mobility. Resource control includes admission control, congestion control, and channel switching which corresponds to changing the data rate of a connection. Base stations, called node Bs (NBs), which are connected to an RNC, orchestrate radio communications with mobile radio stations over an air interface. The RNC controls what system information the Node B should broadcast and is the control plane protocol termination point towards user equipments (UEs). RNCs are also connected to nodes in a core network, i.e., Serving GPRS Support Node (SGSN), Gateway GPRS Support Node (GGSN), mobile switching center (MSC), etc. Core network nodes provide various services to mobile radio users who are connected by the radio access network such as authentication, call routing, charging, service invocation, and access to other networks like the Internet, public switched telephone network (PSTN), Integrated Services Digital Network (ISDN), etc.

The Long Term Evolution (LTE) of UMTS is under development by the 3rd Generation Partnership Project (3GPP) which standardizes UMTS. There are many technical specifications hosted at the 3GPP website relating to Evolved Universal Terrestrial Radio Access (E-UTRA) and Evolved Universal Terrestrial Radio Access Network (E-UTRAN), e.g., 3GPP TS 36.300. The objective of the LTE standardization work is to develop a framework for the evolution of the 3GPP radio-access technology towards a high-data-rate, low-latency and packet-optimized radio-access technology. In particular, LTE aims to support services provided from the packet switched (PS)-domain. A key goal of the 3GPP LTE technology is to enable high-speed packet communications at or above about 100 Mbps.

FIG. 1 illustrates an example of an LTE type mobile communications system 10. An E-UTRAN 12 includes E-UTRAN NodeBs (eNBs) 18 that provide E-UTRA user plane and control plane protocol terminations towards the user equipment (UE) terminals 20 over a radio interface. The eNB controls radio resources and user mobility. An eNB is sometimes more generally referred to as a base station, and a UE is sometimes referred to as a mobile radio terminal or a mobile station. As shown in FIG. 1, the base stations are interconnected with each other by an X2 interface. The base stations are also connected by an S1 interface to an Evolved Packet Core (EPC) 14 which includes a Mobility Management Entity (MME) and to a System Architecture Evolution (SAE) Gateway. The MME/SAE Gateway is shown as a single node 22 in this example and is analogous in many ways to an SGSN/GGSN gateway in UMTS and in GSM/EDGE. The S1 interface supports a many-to-many relation between MMEs/SAE Gateways and eNBs. The E-UTRAN 12 and EPC 14 together form a Public Land Mobile Network (PLMN). The MMEs/SAE Gateways 22 are connected to directly or indirectly to the Internet 16 and to other networks. In the following description, the control plane protocol termination point towards the UEs is called the RAN node. So depending on the RAN configuration, an eNB, RNC, collapsed RNC, and Node B may all be such a RAN node.

There are times when a core network node, like the MME or the SGSN, may be overloaded with control plane (CP) messages because too many mobile users are sending too many messages in a particular time frame. Assuming the core network node queues incoming messages, then the load on the node could be measured based on queue length. If the time that the core network node needs to process the incoming messages is longer than the arrival rate of new messages in the time frame, then the queue length increases. When the queue length passes some limit or when the queue is full, the core network node may consider itself to be overloaded. In that state, the core network node is not able to process the incoming messages in a reasonable time, and there is a risk that some messages may be lost due to queue overflow. Typically, there is one queue for all messages to the core network node, and hence, each radio access network node connected to a core network node should be informed about the overload status. As a result, an overload message must be sent to the radio access network requesting that the signaling load be reduced.

The problem is how best to do this in a way that effectively reduces the CP signaling load on one or more core network nodes but also implements this reduction so that network coverage and capacity are not adversely affected. For example, it would be undesirable to have one radio access network node dramatically cut back on new and/or existing UE connections in an effort to reduce the CP signaling load at the core network node while other radio access network nodes experience little or no cut back as a response to identical overload messages. Nor would it be beneficial to employ a system where mobile radios leave one cell because of actions to reduce CP signaling load, but then simply transfer that same load via a nearby cell resulting in no reduction of the load in the core network node.

Moreover, a core network node may want to avoid sending an overload message to all radio access nodes once the core network node is overloaded because sending each such message requires processing resources, which at that point are overloaded with processing requests. It would be preferable for the core network node to start sending the messages out while it "still has resources", i.e., while processing power can be used for processing out going messages and not all processing power is required to process the queued incoming messages. Depending on load status and how much and how fast the load increases, the core network node may need to adapt the amount of CP load reduction.

Another problem is that when a RAN node is generally instructed to reduce its CP load, that RAN node does not know how much it needs to reduce that load or the reason why. For example, if there is a disaster like an earthquake, then the RAN nodes might want to restrict "normal" communications from all or at least most mobile terminals to make sure that emergency personnel have access and emergency calls can get through. Current guidelines for standardized core networks overload mechanisms simply indicate that a "step size" reduction of the signaling load should be performed if an overload condition exists. But there is no guidance on how that should be interpreted or implemented.

SUMMARY

A cellular radio communications network includes a core network with a core network node coupled to a radio access network (RAN) associated with a first radio access technology for communicating with mobile radio terminals. The RAN includes multiple RAN nodes. Each mobile radio terminal has an associated access class for accessing service from the cellular radio communications network. The core network node detects an overload condition and sends an overload message to the RAN nodes that includes information for reducing the overload condition. Each of the RAN nodes receives the overload message and determines whether an access class restriction should be implemented to reduce the number of mobile radio terminals permitted to access the cellular radio communications network. If so, the RAN node determines one or more access classes of mobile radio terminals to be restricted based on the information in the overload message. Information relating to the one or more restricted access classes is transmitted in an area associated with the RAN node so that the mobile terminals of a restricted access class are prohibited from accessing the cellular radio communications network.

In response to the overload message, each of the RAN nodes may determine that a number of mobile radio terminals permitted to access service from the core network should be redirected or steered to access service from another cellular radio communications network with a radio access network associated with a second radio access technology. For example, the first radio access technology may be one of a WCDMA and LTE-based technology, and the second radio access technology may be the other of the WCDMA and LTE-based technology. Each RAN node then transmits or causes to be transmit a redirection or steering message that redirects or steers the number of mobile radio terminals to obtain access from another cellular radio communications network. Another related feature is that each RAN node may change an idle state camping priority and/or a handover priority of the number of mobile radio terminals to obtain access from another cellular radio communications network.

The information in the overload message may include an indication that redirection or steering of the number of mobiles should be performed or that access class restriction should be performed. The information in the overload message may indicate which access class or classes to restrict or may include an indicator of the number of one or more access classes restricted from accessing the cellular radio communications network. The RAN node can determine which access class or classes to restrict in a random or round robin fashion.

In an example embodiment, the first radio access technology is an LTE-based network, the core network node is an MME, the RAN node is an eNB, and the overload message is an S1 overload message. The MME measures a number of registered mobile radio terminals that the MME is responsible for serving and compares that number to a predetermined threshold in order to determine if an overload condition exists. The MME may measure a length of a message queue associated with the MME and compare that queue length to a predetermined threshold in order to determine if an overload condition exists in the MME. The MME may also determine how much a load on MME needs to be reduced based on a current MME load, a filtered MME load, an increase of MME load and/or an acceleration of MME load.

DETAILED DESCRIPTION

Figure 1:
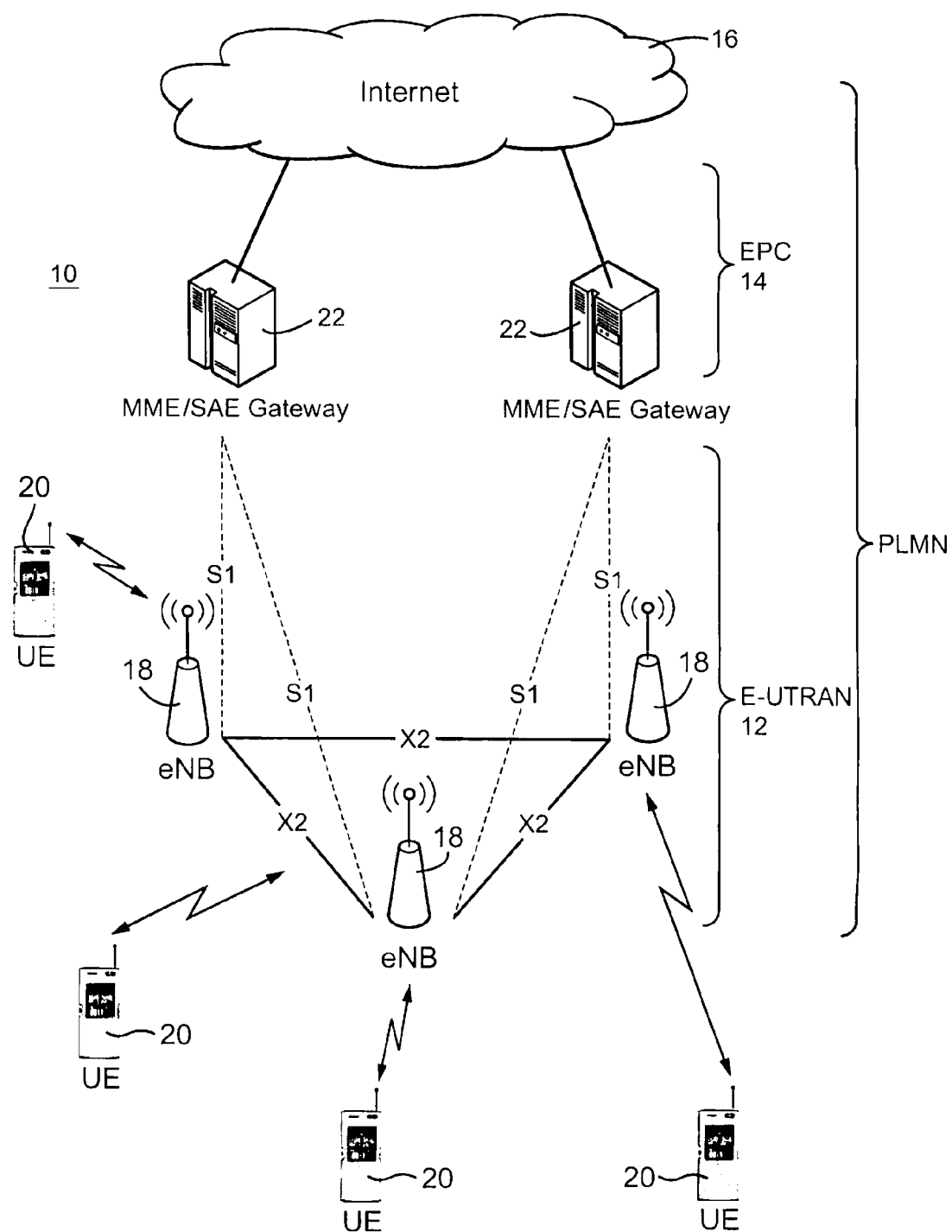
FIG. 1 is a block diagram of an example LTE mobile radio communications system.

In the following description, for purposes of explanation and non-limitation, specific details are set forth, such as particular nodes, functional entities, techniques, protocols, standards, etc. in order to provide an understanding of the described technology. In other instances, detailed descriptions of well-known methods. devices, techniques, etc. are omitted so as not to obscure the description with unnecessary detail.

It will be appreciated by those skilled in the art that block diagrams herein can represent conceptual views of illustrative circuitry embodying the principles of the technology. Similarly, it will be appreciated that any flow charts, state transition diagrams, pseudocode, and the like represent various processes which may be embodied in computer readable medium and so executed by a computer or processor, whether or not such computer or processor is explicitly shown. The functions of the various elements including functional blocks may be provided through the use of dedicated electronic hardware as well as electronic circuitry capable of executing program instructions in association with appropriate software.

It will be apparent to one skilled in the art that other embodiments may be practiced apart from the specific details disclosed below. All statements reciting principles, aspects, and embodiments, as well as specific examples, are intended to encompass both structural and functional equivalents. Such equivalents include both currently known equivalents as well as equivalents developed in the future, i.e., any elements developed that perform the same function, regardless of structure.

When an overload condition is detected by a core network node, the core network node generates an overload message and sends it typically to each RAN node to which it is connected. As defined above, examples of a RAN node include an eNB in LTE and an RNC in UMTS. The RAN nodes respond to that message by reducing the load in one or more of the cell areas for which each RAN node is responsible. Information is included in the overload message from the core network node to each RAN node so that the RAN node can set mobile radio access class restrictions that restrict access to network services in that RAN node's cell area(s). These set access restriction classes are then broadcast by those RAN nodes to all the mobile radios in their respective service areas. Access restriction classes may work in a number of ways with the following as just one example. Each mobile radio belongs to an access restriction class, e.g., one of ten access classes. Access classes can be assigned to mobile terminals in any suitable manner. One non-limiting example way is to uniformly distribute them among mobile radio subscriber identity module (SIM) cards. Other example approaches might include that "gold" subscribers have certain access classes, "silver" subscribers another set of access classes, and "bronze" subscribers still another set of the access classes. Moreover, two operators that share a network might want to divide the access classes such that operator A subscribers have access classes 0 to 4 and operator B subscribers have access classes 5 to 9, but within each operator's access classes, subscribers may be uniformly distributed. All mobile radios belonging to a restricted access class are restricted from accessing that cell. If for example one access class out of ten is broadcast as restricted and if the access classes are uniformly distributed, then 10% of the mobile radios are restricted in the cell so that the CP signaling load associated with that cell is reduced by approximately 10%. If the RAN node broadcasts in the cell that two of ten access classes are restricted, then the CP signaling load associated with that cell is reduced by approximately 20%, and so on. If all ten access classes are restricted, then all normal mobile radios (preferably except those belonging to fire department, police, etc., and emergency calls) are restricted in order to reduce to zero the signaling load from all normal mobile radios.

In a WCDMA network, the SGSN core network node is the network aggregation point of the RAN nodes in UMTS for the packet-switched (PS) domain (especially in UMTS flat architecture) and the MSC is the network aggregation point of the RAN nodes in UMTS for the circuit-switched (CS) domain. The RNC is an aggregation point of the NodeBs in UMTS. The SGSN receives the control plane messages from RAN nodes in UMTS. The SGSN may, for example, automatically select which access classes should to be restricted for the PS domain and provide that information to each RNC to which it is connected, preferably for example in an overload type message sent over the Iu interface to the RNCs. Similarly, the MSC may automatically select which access classes should to be restricted for the CS domain and provide that information to each RNC to which it is connected, preferably in an overload type message sent over the Iu interface to the RNCs. The RNCs may then inform their corresponding node Bs, which then broadcast the access class restrictions in their respective cells. In LTE, the MME may automatically select which access classes should to be restricted and provide that information to the eNBs, preferably in an overload type message over the S1 interface. The eNBs then broadcast the access class restrictions in their respective cells.

LTE has a "flat architecture" where there are many more eNBs than there are RNCs in WCDMA networks. This means that an eNB only serves a few numbers of cells. If each eNB sets its access class restrictions independently from each other, then the area in which a UE with a certain access class is restricted is very limited, e.g., perhaps even only one cell. The problem described earlier is that when a UE leaves one cell because of actions to reduce CP signaling load, but then simply transfers that same load to a nearby cell, there is no reduction of the load in the core network node. This is also a problem in "flat" WCDMA networks with RNC and NodeB collapsed nodes. To configure all the RAN nodes in these flat architectures with access class barring rules would be time and resource demanding due to the significant number of nodes. Using the MME or other core network node to automatically transmit this information is more efficient than having an operator at the operations and maintenance facility do it.

Figure 2:
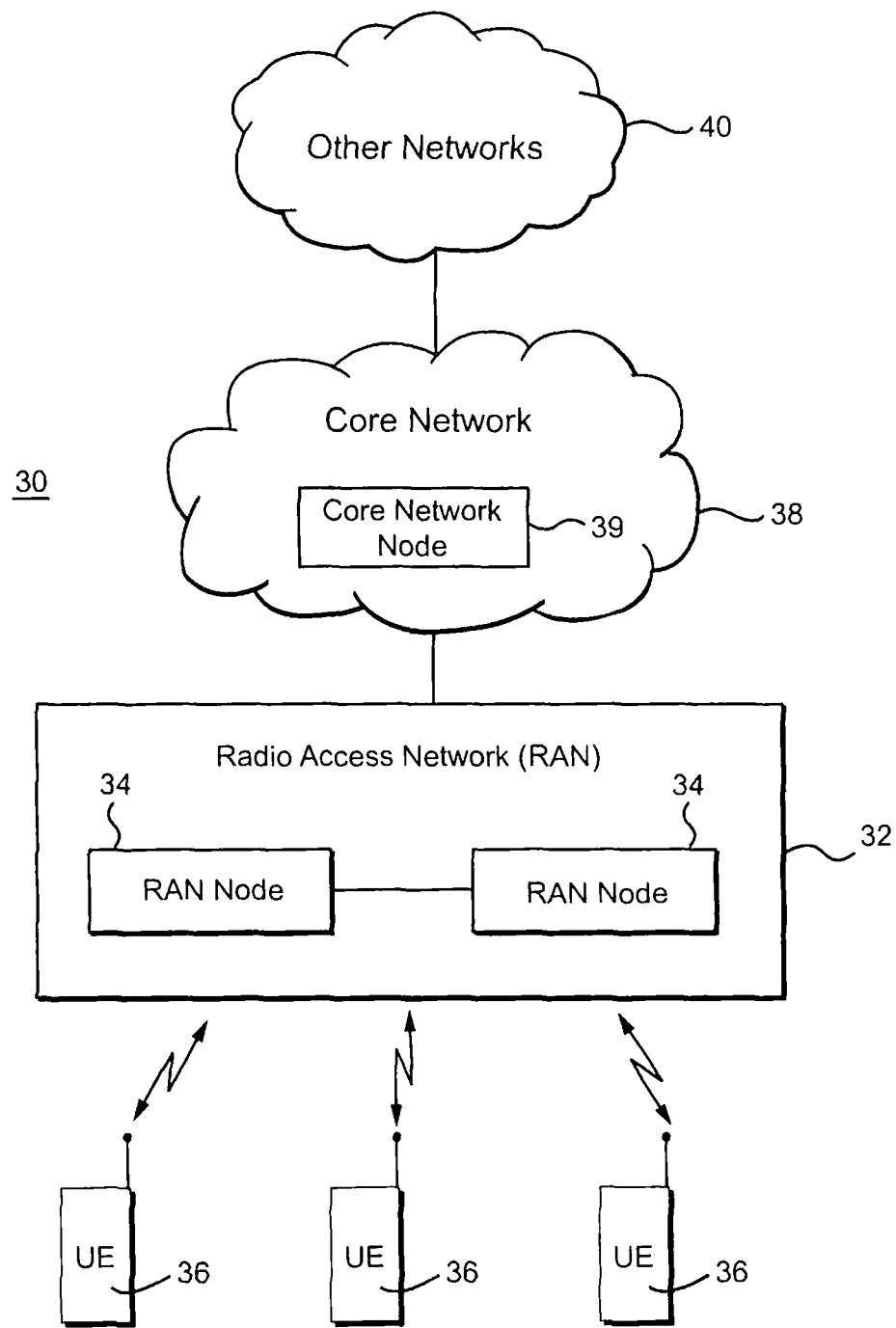
FIG. 2 a block diagram of an example more general mobile radio communications system.

Although well-suited for WCDMA and LTE, this technology may be used in any modern cellular communications system that supports processing overload type messages and access class restrictions. One non-limiting example of a general cellular communications system 30 is shown FIG. 2. A radio access network (RAN) 32 is coupled to a core network 38 that includes one or more core network nodes 39. The core network is coupled to one or more other networks 40 like the Internet. The RAN 32 includes RAN nodes 34 that communicate with each other, e.g., for handover and other coordinated functions. The RAN nodes 34 communicate over the radio/air interface with mobile radio terminals also referred to as user equipment terminals (UEs) 36.

Figure 3A:
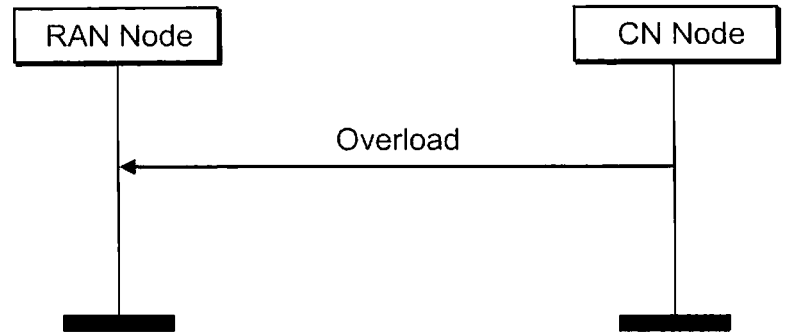
FIGS. 3A and 3B are non-limiting, example signaling diagrams.
Figure 3B:
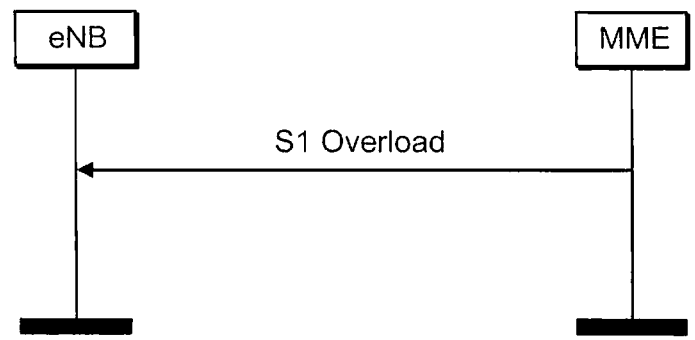

When the core network node 39 determines that a control plane (CP) processing load is at or approaching a predetermined threshold level, the core network node 39 includes information in an overload message from the core network node to the RAN 32 so that one or more RAN nodes 34 can broadcast UE access class restrictions based on this information intended to reduce that overload situation. FIG. 3A shows a general signaling diagram with an overload message being sent from a core network node to a RAN node, and FIG. 3B shows an LTE example where an S1 Overload message is sent from the MME to an eNB. Even though only one RAN node or eNB is shown and selective core network node-RAN node communication is possible, in a preferred embodiment, the overload message is sent to all RAN nodes or eNBs associated with the core network node 39.

One non-limiting example of information that may be included with the CP overload message is an integer from 1 to 10, where a 1 means to set one access class to "barred" in order to reduce the CP load by 10%. The number 2 means to set two access classes to barred in order to reduce the CP load by 20%, etc. Each RAN node 34 may then select, e.g., randomly or otherwise, which access classes to bar or restrict.

Alternatively, the core network node 39 may also identify the access classes to be set as barred so that the core network node 39 can control which classes are restricted. It may also be beneficial to also send which access classes should be used in a certain area, e.g., a tracking area. In this way, the same access classes to be barred could be sent to all the RAN nodes in the same area to prevent a UE from simply moving from its current connect access-barred cell to another nearby cell and get access there instead, which would not result in reduced CP load at the core network node 39. The core network node 39 could randomly select access classes to be barred in a tracking area.

If access class barring is not available because it is not implemented or not purchased or not desirable, e.g., because access class distribution in the SIM cards is unknown or other networks might have available resources, then the RAN node can redirect some percentage of UEs in one or more of its cells to another mobile radio communications network providing service in the same area, e.g., another radio access technology (RAT) network. For example, a WCDMA network and an LTE network might be available to service one area. Redirecting includes one or more of rejecting a UE access connection request or releasing a current UE connection and directing the UE connection to another network with the same or different RAT. Redirection may be triggered by and/or based on information received from the core network node 39 in an overload message. For example, the RAN node might perform redirection of a certain amount of UEs to another RAT based on the number of restricted access classes received in a CP overload message interpreted as a percentage of the load that needs to be reduced. In an example LTE context, if the MME and the SGSN arc collapsed into a single node, then the MME could be aware of the SGSN CP load as compared to its own CP load. if the SGSN's CP load situation is much better than the MME CP load situation, it may be useful to inform the eNBs of this. The eNBs may then elect to redirect UEs to another RAT instead of performing access class barring. There may be other ways than redirection to steer UEs from one network to another network such as changing UE camping priorities or handover priorities of a suitable group of UEs.

If the eNB is not aware of the access class that each UE belongs to, then eNBs in an area should preferably all use the same method, e.g., all use access class baring or all use redirection/steering. A UE that is access class restricted in cells of one eNB may or may not he redirected or steered to another network in a neighboring eNB that uses redirection or steering to reduce load. A redirection or steering mechanism cannot assure that UEs of a certain access class do not get service. A UE can then simply move to another nearby cell (or frequency) and get access there instead, which would not reduce the load in the core network node. Hence, a recommendation from the core network node to use access class baring or redirection/steering may be helpful, and it may be necessary that the RAN node follows this recommendation.

Figure 4:
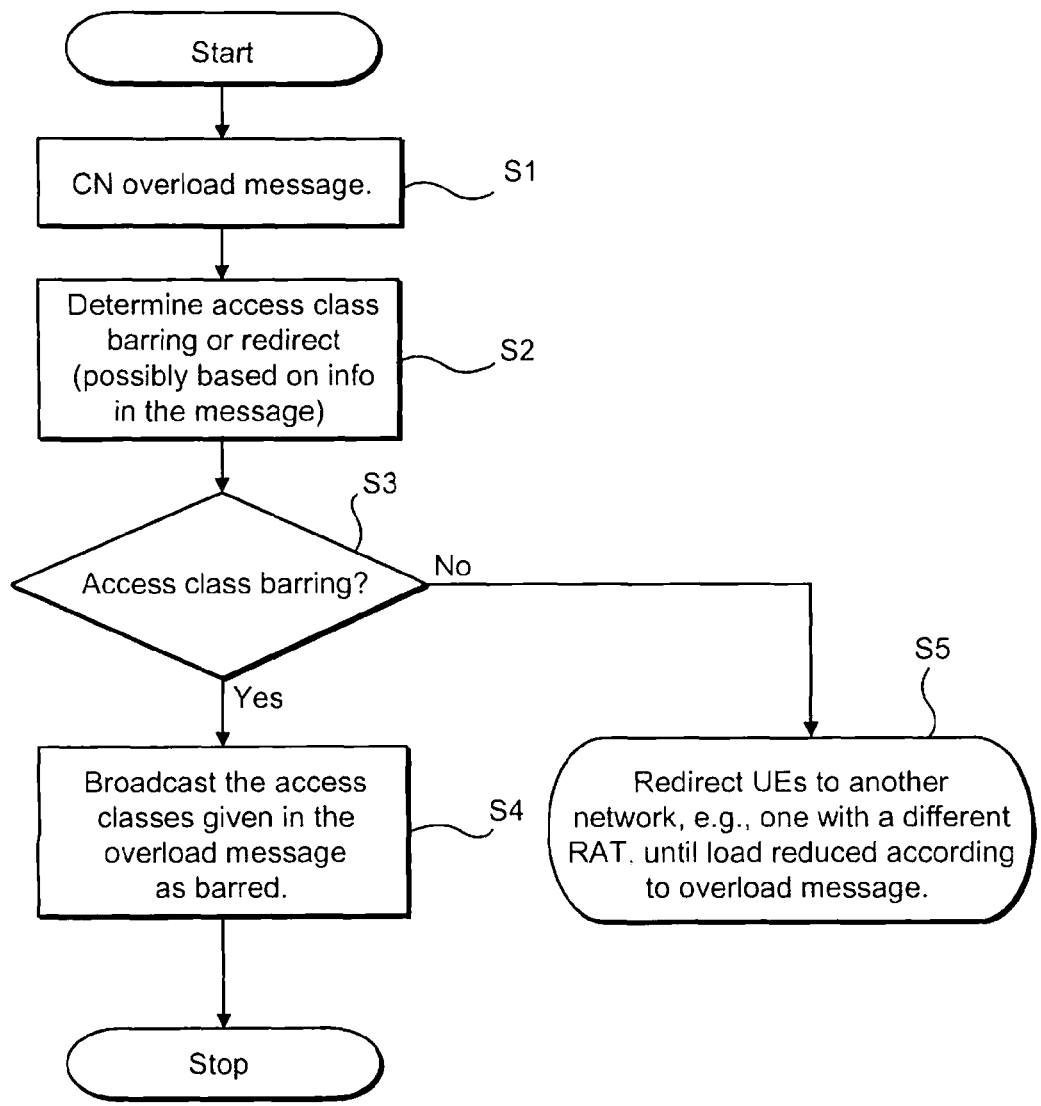
FIG. 4 is a flowchart diagram illustrating non-limiting, example procedures for reducing core network processing load.

Reference is made to the flowchart in FIG. 4 which shows non-limiting, example procedures for handling CP overload at a core network node. A core network CP overload message is sent from the core network (CN) node to a radio access network node, and preferably to one or more RAN nodes (step S1). The radio access network node then determines that access class barring or RAT redirection should be taken based on information in the overload message (step S2). Another example of information that may be included in the overload message is a bit string of ten bits assuming there are ten UE access classes. The first bit indicates whether the first access class should be restricted or not, the second bit whether the second access class should be restricted or not, and so on. If a bit is a zero, it could be interpreted as "should not be restricted," and if that bit is a one, it could he interpreted as "should be restricted," or vice versa. A decision is then made whether to use access class barring (step S3).

The decision may be based on an indication from the core network node whether access class barring or traffic/load steering for UE redirection is preferred. But both techniques may be employed. Alternatively, the decision may be based on how much the load should be reduced. UE redirection requires radio signaling resources and thus may not be a preferred alternative when a significant load reduction is needed. It may be configured by the operator to always use one mechanism or only one mechanism could be available. If access class barring is used, the RAN node broadcasts the barred access class(es) to its cell area(s) (step S4). If access class barring is not used, the RAN node redirects or steers UEs in its cell area(s) to another RAT that provides services in this same coverage area (step S5).

In a non-limiting example, the MME measures the number of registered UEs that the MME is responsible for servicing. The number of registered UEs could be measured at appropriate intervals, and the MME could base the overload measure on one sample or some filtered value of several samples. The MME compares that number to a maximum or other predetermined threshold number. For example, the MME might set a limit at when the number of registered UEs is 90% of the maximum. At that point. the MME considers itself to be at or approaching overload, and the MME sends out S1 overload messages to the eNBs connected to the MME. The MME might send out the overload message in a round-robin fashion (or in some other order) until all eNBs are informed about the overload status. Another example way to measure the load is using the queue length as described in the background section.

In the S1 overload message, the MME may include a bit string of ten bits assuming an example of ten access classes. If each eNB that receives the overload message decides to reduce the load by sending access class restrictions on the broadcast cannel, then the eNB could interpret the bit string such that the first bit would indicate whether a first access class should be restricted or not, the second bit whether a second access class should be restricted or not, and so on. If a bit is zero it could be interpreted as "it should not be restricted" and if it is one it could be interpreted as "it should be restricted", or vice versa. If the eNB decides to reduce the load in some other way, as for example redirection to another RAT, then the eNB could interpret the bit string such that if the bit string has one bit set to one, then the eNB may interpret this as 10% of the load should be reduced by redirecting 10% of the UE's to that other RAT.

Figure 5:
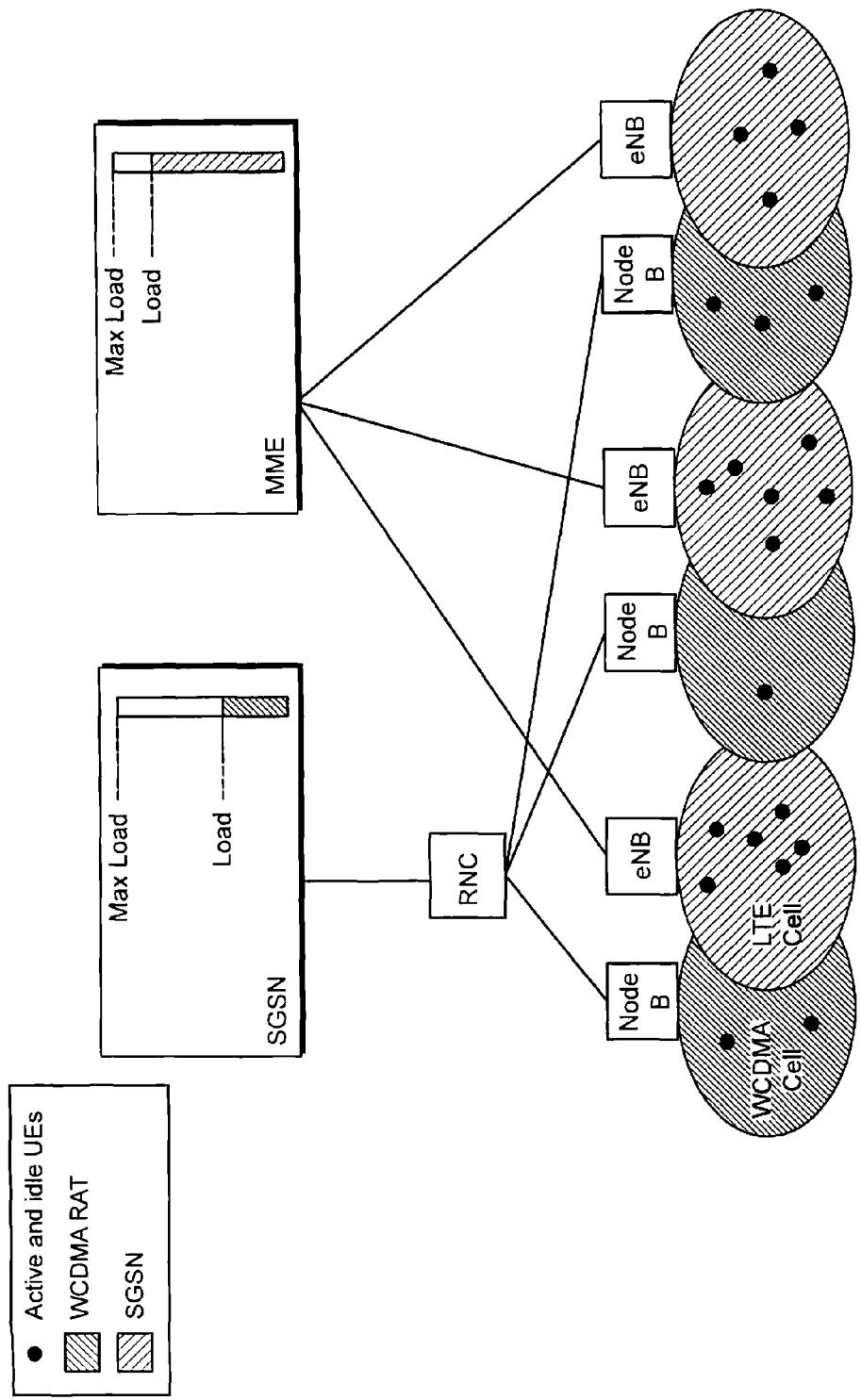
FIG. 5 is a block diagram showing a UE connection redirection example.

FIG. 5 illustrates two RATS that have different CP loads. The first RAT is based on WCDMA, where the CP load in the SGSN is moderate to low. The second RAT is based on LTE, where the CP load in the MME is high and nearly reaching a maximum. The different loads are also represented by fewer active UEs in the WCDMA cells as compared to the LTE cells. In this case, the eNBs in the LTE system, upon receiving an S1 overload message, may elect to redirect new and/or existing UE connections to the WCDMA system for service in order to reduce the CP on the MME. In addition to indicating to the eNBs RAT redirection for a certain percentage or number of UEs, the MME may also identify the particular other available RAT(s), e.g., UTRAN, GERAN, 3GPP2, WiMax, etc.

Using the technology described above, the MME in an LTE system (and a similar core network node in over systems) may control which UE access classes should be restricted in a certain area, e.g., a tracking area or location area. In this way, the same access classes may be broadcasted in all the cells of an area. A benefit here is that a UE cannot simply move to another nearby cell (or frequency) and get access there instead which would not reduce the load in the core network node. Once the MME determines how much the load should be reduced, then the MME may select which access classes to be barred in an area. There is no need to configure which access classes 0 to 9 should be barred in the MME or in the eNBs. Random selection of access classes to be barred may be used and results in UEs belonging to different access classes being restricted from access in an area approximately equally often. If access restriction is to be maintained for a long period, the MME may send a new overload message to change the access classes to be barred, and in this way, achieve a fair restriction time for different access classes. The information can be interpreted as a percentage of load to be reduced when methods other than access class barring are used to reduce the load.

Another benefit is that there is no need for human intervention to set the access classes. The eNB receives the information that the MME is overloaded and which access classes should be barred at the same time. Such direct and automated communication would be problematic if the access classes to be barred were provided by some other node, e.g., an O&M node. If the access classes were provided by a different node than the MME node, then the problem is that this other node does not know which eNBs have been receiving the overload message from the MME. On the other hand, the MME has control of how much the eNBs reduce the CP load and then determines the distribution speed of the overload messages to the different eNBs. The MME thus can determine and signal how much the CP load should be reduced based on the current or filtered load status, on the load increase, and/or on the load acceleration.

None of the above description should be read as implying that any particular element, step, range, or function is essential such that it must be included in the claims scope. The scope of patented subject matter is defined only by the claims. The extent of legal protection is defined by the words recited in the allowed claims and their equivalents. All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. No claim is intended to invoke paragraph 6 of 35 USC §112 unless the words "means for" or "step for" are used. Furthermore, no embodiment, feature, component, or step in this specification is intended to be dedicated to the public regardless of whether the embodiment, feature, component, or step is recited in the claims.

The invention claimed is:

1. A method of a cellular radio communication network including a core network with a node of a core network (CN) coupled to nodes in a radio access network (RAN) associated with a first radio access technology for communicating with mobile radio terminals, each mobile radio terminal having an associated access class for accessing service from the cellular radio communication network, wherein the CN node detects an overload condition and sends an overload message to the RAN nodes that includes information for reducing the overload condition, the method comprising in a RAN node:
receiving the overload message;
in response to the overload message, determining whether to implement an access class restriction to reduce a first number of mobile radio terminals permitted to access the cellular radio communication network;
determining at least one access class of mobile radio terminals to be restricted based on information in the overload message; and
arranging for information relating to the at least one restricted access class to be transmitted in an area associated with the RAN node so that mobile radio terminals of a restricted access class are prohibited from accessing the cellular radio communication network;
wherein information in the overload message includes an indicator of an amount of access classes to be restricted from accessing the cellular radio communication network.

2. The method of claim 1, further comprising:
in response to the overload message, determining a second number of mobile radio terminals to be redirected to access service from another cellular radio communication network with a RAN associated with a second radio access technology, the second number of mobile radio terminals being permitted to access service from the CN; and
arranging for a redirection message to be transmitted that redirects the number of mobile radio terminals to obtain access from another cellular radio communications network.

3. The method of claim 2, further comprising changing at least one of an idle state camping priority and a handover priority of the second number of mobile radio terminals to obtain access from another cellular radio communication network.

4. The method of claim 2, wherein the first radio access technology is one of a wideband code division multiple access (WCDMA) technology and a long term evolution (LTE) technology, and the second radio access technology is the other of the WCDMA technology and the LTE technology.

5. The method of claim 4, wherein information in the overload message includes an indication that redirection of the second number of mobile radio terminals should be performed or that access class restriction should be performed.

6. The method of claim 1, wherein the at least one access class to be restricted is randomly determined.

7. The method of claim 1, wherein information in the overload message indicates which of the at least one access class is to be restricted.

8. The method of claim 1, wherein the first cellular radio communication network is a network based on long term evolution technology, the CN node is a mobile management entity (MME), the RAN node is an evolved NodeB, and the overload message is an S1 overload message.

9. The method of claim 8, wherein the MME measures a number of registered mobile radio terminals that the MME is responsible for serving and compares the measured number to a predetermined threshold in order to determine if an overload condition exists.

10. The method of claim 8, wherein the MME measures a length of a message queue associated with the MME and compares the measured queue length to a predetermined threshold in order to determine if an overload condition exists in the MME.

11. The method of claim 8, wherein the MME determines how much a load on MME needs to be reduced based on at least one of a current MME load, a filtered MME load, an increase of MME load, and an acceleration of MME load.

12. The method of claim 8, wherein the MME arranges for the overload message to be sent to RAN nodes in a round-robin fashion.

13. A core network (CN) node for a cellular radio communication network including a radio access network (RAN) having RAN nodes associated with a first radio access technology for communicating with mobile radio terminals, the mobile radio terminals having associated access classes for accessing service from the cellular radio communication network, the CN node comprising:
a processor configured to detect an overload condition, and to send an overload message to the RAN nodes, wherein the overload message includes mobile radio terminal access class restriction information for reducing the overload condition by causing a RAN node receiving the overload message to determine a need for an access class restriction to reduce a first number of mobile radio terminals permitted to access service from the cellular radio communication network, to determine at least one access class to be restricted based on information in the overload message, and to cause to be transmitted in an area associated with the RAN node information relating to the at least one access class to be restricted so that the mobile radio terminals in the at least one access class to be restricted are prohibited from accessing the cellular radio communication network;
wherein information in the overload message includes an indicator of an amount of access classes to be restricted from accessing the cellular radio communication network.

14. The core network node of claim 13, wherein the information in the overload message includes an indication that a second number of mobile radio terminals should be redirected to access service from another cellular radio communications network with a radio access network associated with a second radio access technology.

15. The core network node of claim 14, wherein the first radio access technology is one of a wideband code division multiple access (WCDMA) technology and a long term evolution (LTE) technology, and the second radio access technology is the other of the WCDMA technology and the LTE technology.

16. The core network node of claim 13, wherein the information in the overload message indicates which of the at least one access classes is to be restricted.

17. The core network node of claim 13, wherein the first cellular radio communication network is a network based on long term evolution technology, the core network node is a mobile management entity (MME), the RAN node is an evolved NodeB, and the overload message is an S1 overload message.

18. The core network node of claim 17, wherein the MME is configured to measure a number of registered mobile radio terminals that the MME is responsible for serving and to compare the measured number to a predetermined threshold in order to determine if an overload condition exists.

19. The core network node of claim 17, wherein the MME is configured to measure a length of a message queue associated with the MME and to compare the measured queue length to a predetermined threshold in order to determine if an overload condition exists in the MME.

20. The core network node of claim 17, wherein the MME is configured to determine how much a load on the MME needs to be reduced based on at least one of a current MME load, a filtered MME load, an increase of MME load, and an acceleration of MME load.

21. The core network node of claim 17, wherein the MME is configured to send the overload message to RAN nodes in a random or round-robin fashion.

22. A node for a radio access network (RAN), the RAN node being associated with a first radio access technology for communicating with mobile radio terminals having associated access classes for accessing service from a cellular radio communication network including the RAN and a core network with a core network node coupled to the RAN node, the RAN node comprising:
at least one processor configured to receive an overload message from the core network node that includes mobile radio terminal access class restriction information for reducing an overload condition, to determine a need for an access class restriction to reduce a first number of mobile radio terminals permitted to access service from the cellular radio communication network, to determine at least one access class to be restricted based on information in the overload message, and to cause to be transmitted in an area associated with the RAN node information relating to the at least one access class to be restricted so that the mobile radio terminals in the at least one access class to be restricted are prohibited from accessing the cellular radio communication network;
wherein information in the overload message includes an indicator of an amount of access classes to be restricted from accessing the cellular radio communication network.

23. The RAN node of claim 22, wherein the processor is further configured to determine, in response to the overload message, that a second number of the mobile radio terminals permitted to access service from the core network should be redirected to access service from another cellular radio communication network with a RAN associated with a second radio access technology different from the first radio access technology, and to cause to be transmitted a redirection message that redirects the second number of mobile radio terminals to obtain access from the another cellular radio communication network.

24. The RAN node of claim 23, wherein the RAN node is further configured to change at least one of an idle state camping priority and a handover priority of the second number of mobile radio terminals to obtain access from another cellular radio communication network.

25. The RAN node of claim 22, wherein the first radio access technology is one of a wideband code division multiple access (WCDMA) and a long term evolution (LTE) technology, and the second radio access technology is the other of the WCDMA technology and the LTE technology.

26. The RAN node of claim 24, wherein information in the overload message includes an indication that redirection of the second number of mobile radio terminals should be performed or that access class restriction should be performed.

27. The RAN node of claim 22, wherein the RAN node is further configured to determine randomly which access classes are to be restricted.

28. The RAN node of claim 22, wherein information in the overload message indicates which of the at least one access classes is to be restricted.

29. The RAN node of claim 22, wherein the first cellular radio communications network is a network based on long term evolution technology, the core network node is a mobile management entity, the RAN node is an evolved Node B, and the overload message is an Si overload message.

* * * * *